(12) United States Patent
Liu

(10) Patent No.: US 11,049,281 B2
(45) Date of Patent: Jun. 29, 2021

(54) IMAGE CALIBRATING METHOD AND RELATED MONITORING CAMERA SYSTEM

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 49 days.

(21) Appl. No.: 16/671,187

(22) Filed: Nov. 1, 2019

(65) Prior Publication Data
US 2020/0402259 A1 Dec. 24, 2020

(30) Foreign Application Priority Data
Jun. 21, 2019 (TW) ................. 108121745

(51) Int. Cl.
*G06T 7/80* (2017.01)
*H04N 7/18* (2006.01)

(52) U.S. Cl.
CPC .............. *G06T 7/80* (2017.01); *H04N 7/18* (2013.01); *G06T 2207/30204* (2013.01); *G06T 2207/30232* (2013.01)

(58) Field of Classification Search
CPC ............ G06T 7/80; G06T 2207/30232; G06T 2207/30204; G06T 7/246; G06T 3/40; H04N 7/18
USPC ....................................................... 348/159
See application file for complete search history.

(56) References Cited

U.S. PATENT DOCUMENTS

| 6,023,588 A * | 2/2000 | Ray .................... H04N 13/239 396/20 |
| 6,542,249 B1 * | 4/2003 | Kofman ............. G01B 11/2513 356/601 |
| 9,129,181 B1 * | 9/2015 | Nathan ................ G06K 9/3241 |
| 10,298,910 B1 * | 5/2019 | Kroeger ............. G06K 9/00791 |
| 2009/0304234 A1 * | 12/2009 | Kondo .................... G06T 7/248 382/103 |
| 2013/0329052 A1 * | 12/2013 | Chew ..................... H04N 7/181 348/159 |
| 2015/0369593 A1 * | 12/2015 | Myllykoski ............... G06T 7/62 348/136 |
| 2016/0012589 A1 * | 1/2016 | Hamer ...................... G06T 7/80 348/148 |
| 2016/0063705 A1 * | 3/2016 | Xu ..................... H04N 5/23238 382/199 |
| 2016/0171004 A1 * | 6/2016 | Zhang ..................... G06F 16/56 382/106 |

(Continued)

Primary Examiner — Marnie A Matt
(74) Attorney, Agent, or Firm — Winston Hsu

(57) ABSTRACT

An image calibrating method is applied to a first monitoring image and a second monitoring image partly overlapped with each other. The image calibrating method includes detecting a plurality of first marking points and second marking points about a target object on the first monitoring image and the second monitoring image, computing a first trace and a second trace formed by the first marking points and the second marking points, setting a plurality of first estimating points and second estimating points on stretching sections on the first trace and the second respectively within the second monitoring image and the first monitoring image, and utilizing the first marking points and the second estimating points and/or the first estimating points and the second marking points to compute a shift between the first monitoring image and the second monitoring image.

20 Claims, 5 Drawing Sheets

(56) References Cited

U.S. PATENT DOCUMENTS

2019/0114784 A1\* 4/2019 Gao ................. G06T 7/207
2019/0182415 A1\* 6/2019 Sivan ................ G06F 3/013

\* cited by examiner

IMAGE CALIBRATING METHOD AND RELATED MONITORING CAMERA SYSTEM

BACKGROUND OF THE INVENTION

1. Field of the Invention

The present invention relates to an image calibrating method and a related monitoring camera system, and more particularly, to an image calibrating method of combining actual sampling points with estimated sampling points to increase image stitching accuracy and a related monitoring camera system.

2. Description of the Prior Art

A conventional monitoring camera system utilizes several monitoring cameras located side-by-side to capture small-range monitoring images respectively in different orientation, and stitches the small-range monitoring images to form a large-range monitoring image. Two adjacent monitoring images of the small-range monitoring images are partly overlapped, and features in an overlapped area are detected and utilized to stitch the adjacent monitoring images. In the conventional monitoring camera system, one field of view of the monitoring camera is slightly overlapped with another field of view of the adjacent monitoring camera for acquiring the large-range monitoring image with sufficient dimensions, and an amount of the feature in the overlapped area is reduced in response to small dimensions of the overlapped area, so that stitching accuracy of the conventional monitoring camera system is decreased accordingly. If the conventional monitoring camera system enlarges dimensions of the overlapped area, a field of view of the stitching image cannot contain the field of view of the predefined large-range monitoring image and does not conform to the user's demand.

SUMMARY OF THE INVENTION

The present invention provides an image calibrating method of combining actual sampling points with estimated sampling points to increase image stitching accuracy and a related monitoring camera system for solving above drawbacks.

According to the claimed invention, an image calibrating method is applied to a monitoring camera system having a first monitoring camera and a second monitoring camera. A first monitoring image acquired by the first monitoring camera is partly overlapped with a second monitoring image acquired by the second monitoring camera. The image calibrating method includes detecting a plurality of first marking points about a target object within the first monitoring image and a plurality of second marking points about the target object within the second monitoring image, computing a first trace formed by the plurality of first marking points and a second trace formed by the plurality of second marking points, setting a plurality of first estimating points on a stretching section of the first trace within the second monitoring image, setting a plurality of second estimating points on a stretching section of the second trace within the first monitoring image, and utilizing the plurality of first marking points and the plurality of second estimating points and/or further utilizing the plurality of first estimating points and the plurality of second marking points to compute a shift between the first monitoring image and the second monitoring image.

According to the claimed invention, the monitoring camera system includes a first monitoring camera, a second monitoring camera and an operation processor. The first monitoring camera is adapted to acquire a first monitoring image. The second monitoring camera is adapted to acquire a second monitoring image partly overlapped with the first monitoring image. The operation processor is electrically connected to the first monitoring camera and the second monitoring camera for acquiring the first monitoring image and the second monitoring image. The operation processor is adapted to detect a plurality of first marking points about a target object within the first monitoring image and a plurality of second marking points about the target object within the second monitoring image, compute a first trace formed by the plurality of first marking points and a second trace formed by the plurality of second marking points, set a plurality of first estimating points on a stretching section of the first trace within the second monitoring image, set a plurality of second estimating points on a stretching section of the second trace within the first monitoring image, and utilize the plurality of first marking points and the plurality of second estimating points and/or further utilize the plurality of first estimating points and the plurality of second marking points for computing a shift between the first monitoring image and the second monitoring image.

According to the claimed invention, a monitoring camera system includes a first monitoring camera adapted to acquire a first monitoring image and receive a second monitoring image partly overlapped with the first monitoring image. The first monitoring camera includes an operation processor adapted to detect a plurality of first marking points about a target object within the first monitoring image and a plurality of second marking points about the target object within the second monitoring image, compute a first trace formed by the plurality of first marking points and a second trace formed by the plurality of second marking points, set a plurality of first estimating points on a stretching section of the first trace within the second monitoring image, set a plurality of second estimating points on a stretching section of the second trace within the first monitoring image, and utilize the plurality of first marking points and the plurality of second estimating points and/or further utilize the plurality of first estimating points and the plurality of second marking points for computing a shift between the first monitoring image and the second monitoring image.

The image calibrating method and related monitoring camera system of the present invention can not only utilize the interval between the marking points in an overlapped area of two monitoring images to compute the shift and the rotation, but also can set the estimating points on the stretching section stayed inside one monitoring image and stretched from the trace established by the marking points on another monitoring image; difference between the marking point and the estimating point located outside the overlapped area of the monitoring images can be applied to compute the shift. The image calibrating method of the present invention can estimate the previous trace before the target object enters the monitoring area and the following trace when the target object leaves the monitoring area, so that a range about the overlapped area of the monitoring images can be enlarged to increase the amount of the sampling points for computing the accurate shift of the monitoring images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
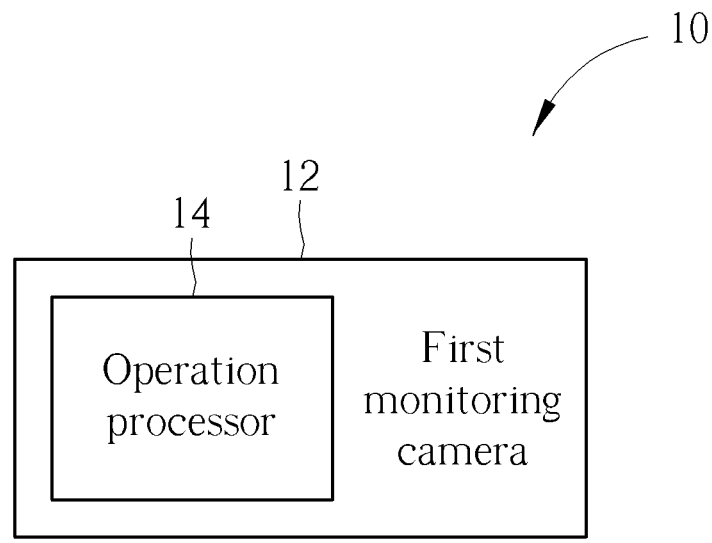
FIG. 1 and FIG. 2 are functional diagrams of a monitoring camera system according to different embodiments of the present invention.
Figure 2:
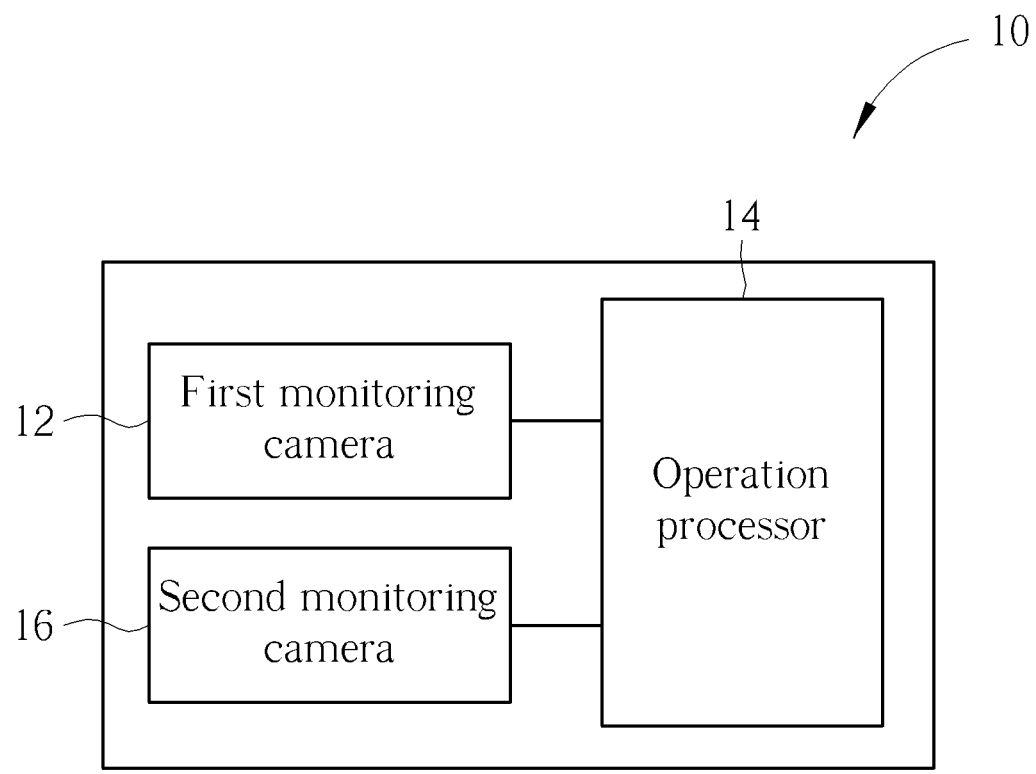
Figure 3:
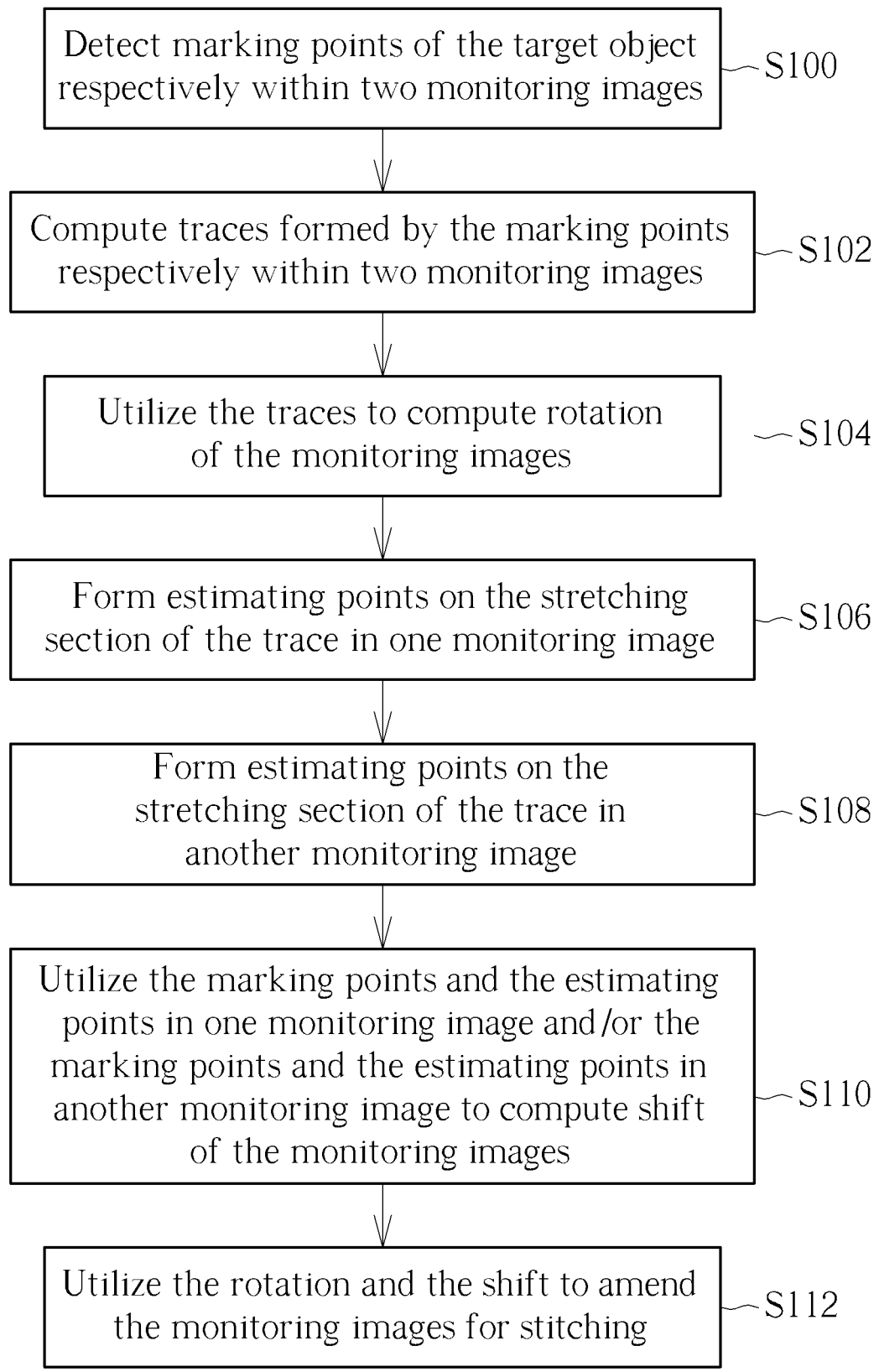
FIG. 3 is a flow chart of an image calibrating method according to an embodiment of the present invention.

Please refer to FIG. 1 to FIG. 3. FIG. 1 and FIG. 2 are functional diagrams of a monitoring camera system 10 according to different embodiments of the present invention. FIG. 3 is a flow chart of an image calibrating method according to an embodiment of the present invention. The image calibrating method illustrated in FIG. 3 can be suitable for the monitoring camera system 10 shown in FIG. 1 and FIG. 2. The monitoring camera system 10 can at least include a first monitoring camera 12 and an operation processor 14. The operation processor 14 can be a built-in electronic unit of the first monitoring camera 12, such as the embodiment shown in FIG. 1; the operation processor 14 further can be an electronic unit independent of the first monitoring camera 12, such as the embodiment shown in FIG. 2. The operation processor 14 can analyze two monitoring images which are partly overlapped with each other to execute the image calibrating method, so as to increase stitching accuracy of the two monitoring images.

In some possible embodiments of the present invention, the first monitoring camera 12 can capture or acquire a first monitoring image, and receive a second monitoring image partly overlapped with the first monitoring image in a wire manner on in a wireless manner; further, the monitoring camera system 10 may include a second monitoring camera 16 electrically connected to the operation processor 14, and the second monitoring camera 16 can capture or acquire the second monitoring image partly overlapped with the first monitoring image. That is to say, the operation processor 14 may be connected to the first monitoring camera 12 for acquiring the captured first monitoring image and the received second monitoring image, or the operation processor 14 may be connected to the first monitoring camera 12 and the second monitoring camera 16 for acquiring the first monitoring image and the second monitoring image respectively.

Figure 4:
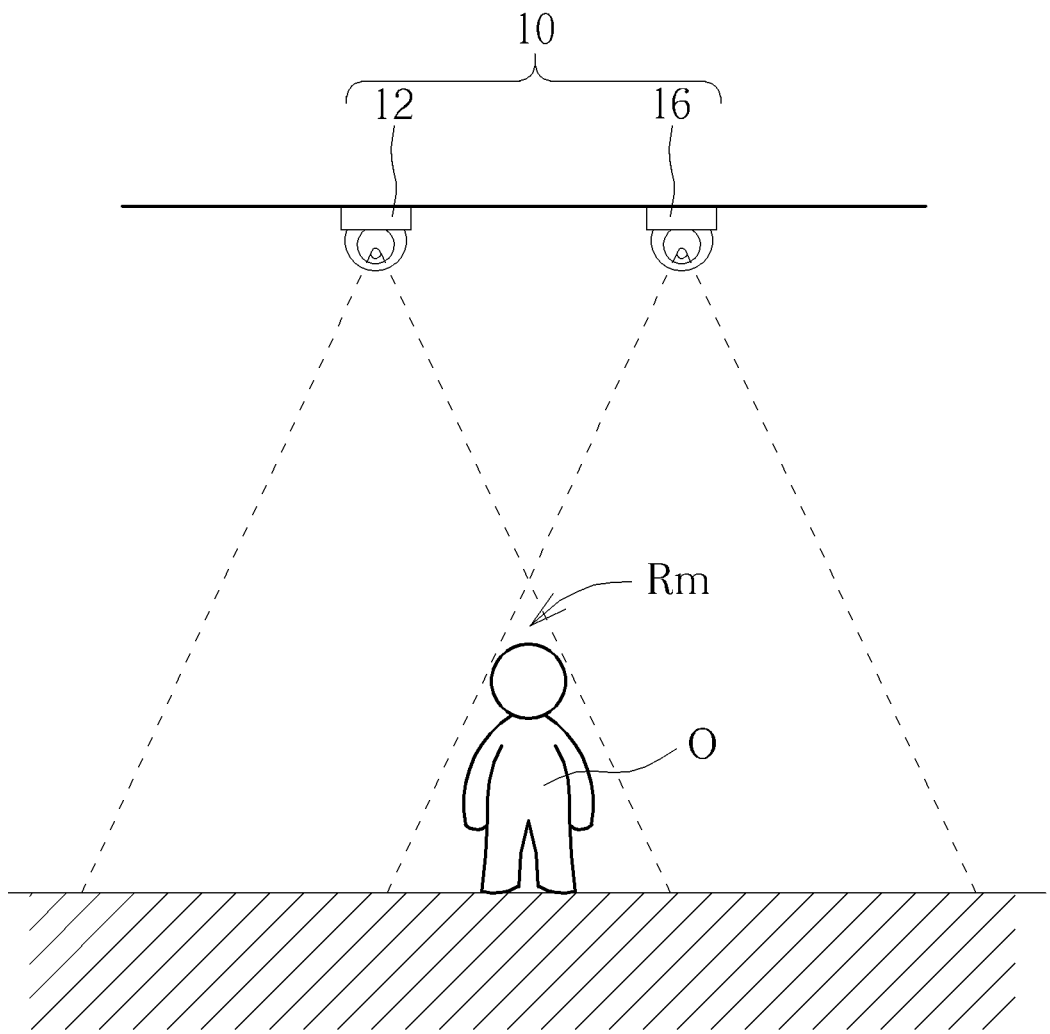
FIG. 4 is a diagram of the monitoring camera system according to the embodiment of the present invention.
Figure 5:
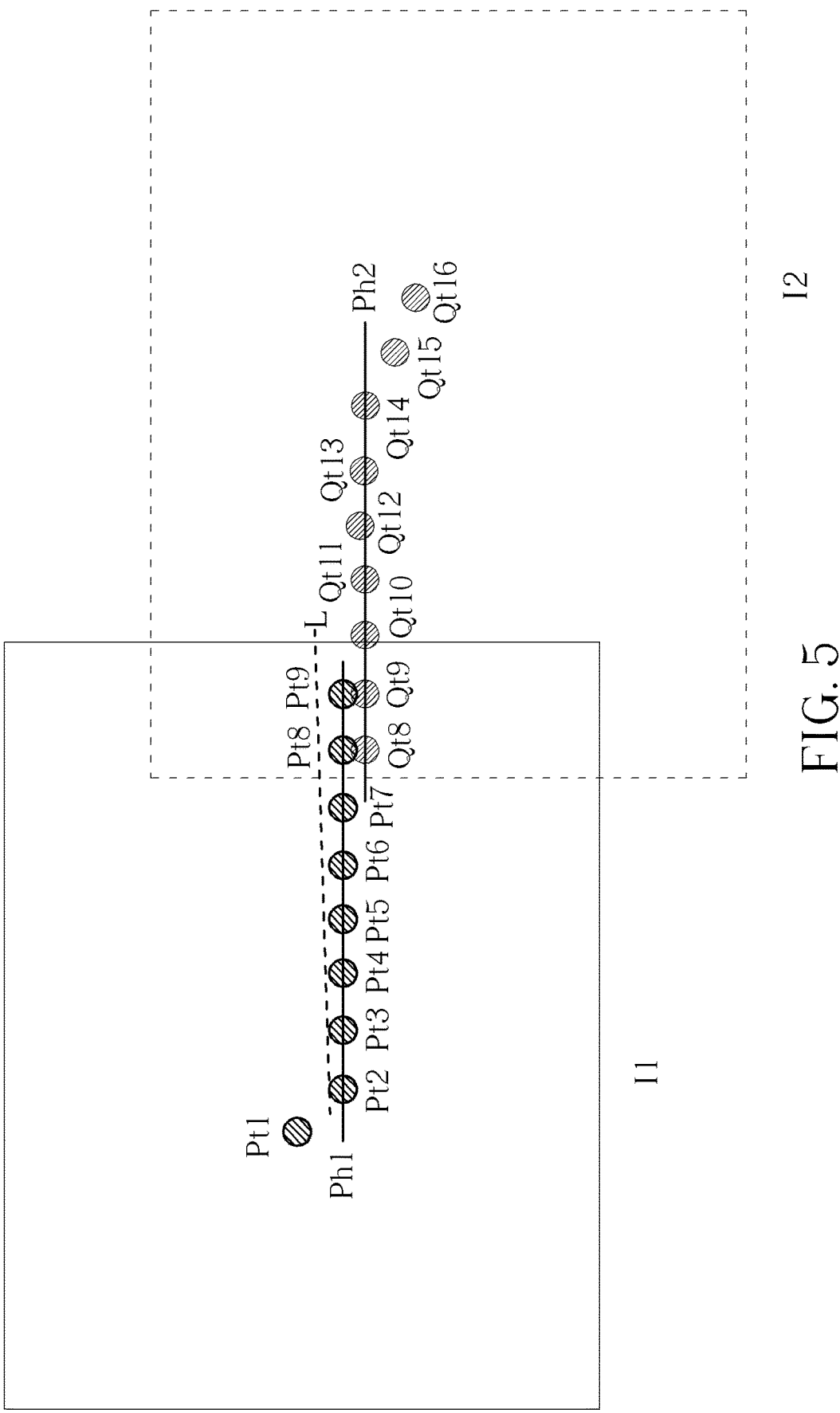
FIG. 5 is a diagram of a first monitoring image and a second monitoring image before image calibration according to the embodiment of the present invention.
Figure 6:
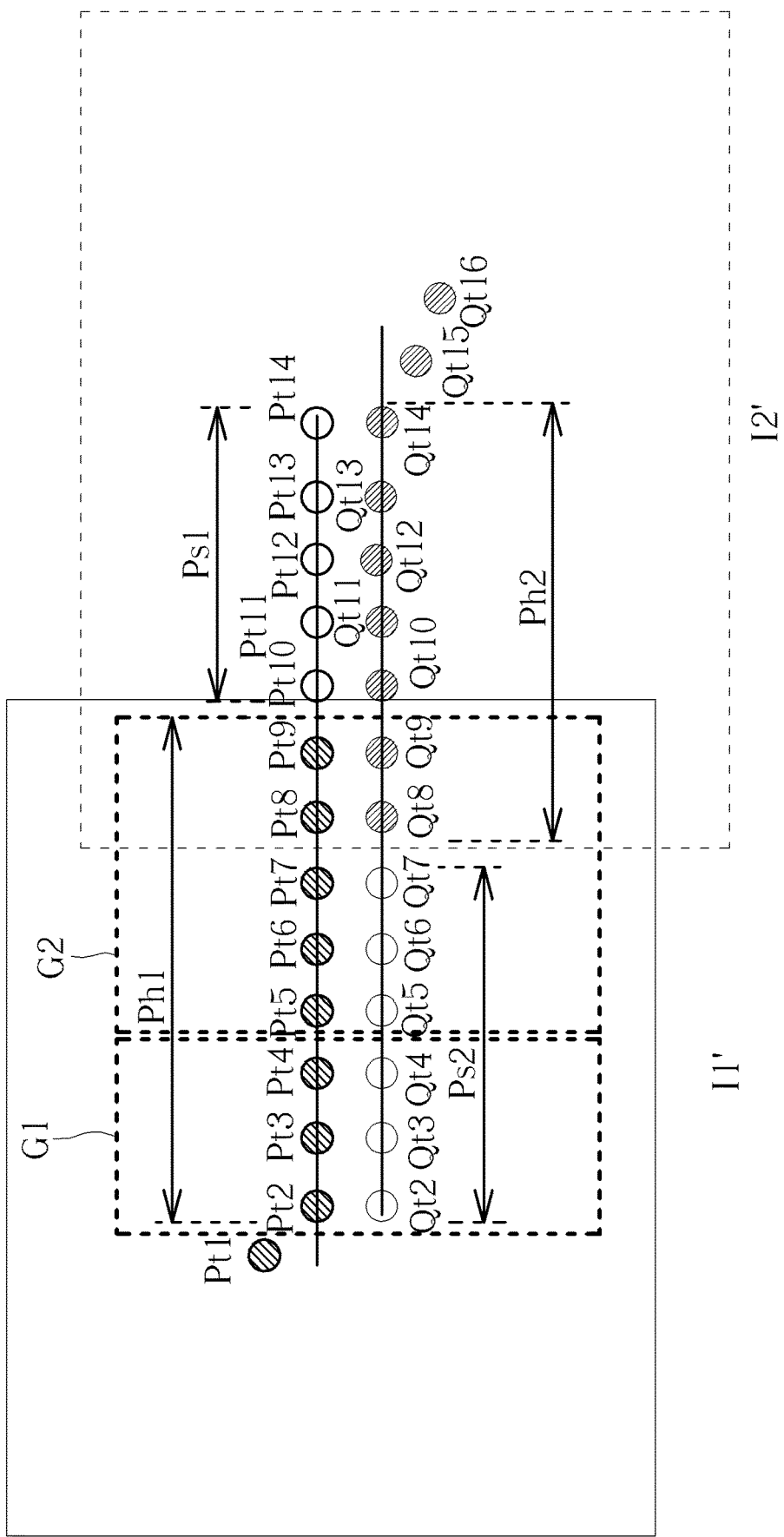
FIG. 6 is a diagram of the first monitoring image and the second monitoring image in the image calibration according to the embodiment of the present invention.

Please refer to FIG. 3 to FIG. 6. FIG. 4 is a diagram of the monitoring camera system 10 according to the embodiment of the present invention. FIG. 5 is a diagram of the first monitoring image I1 and the second monitoring image I2 before image calibration according to the embodiment of the present invention. FIG. 6 is a diagram of the first monitoring image I1' and the second monitoring image I2' in the image calibration according to the embodiment of the present invention. First, step S100 is executed to detect a target object O inside a monitoring region Rm of the monitoring camera system 10, for acquiring a plurality of first marking points Pt1~Pt9 about the target object O within the first monitoring image I1 and a plurality of second marking points Qt8~Qt16 about the target object O within the second monitoring image I2. Then, step S102 is executed to compute a first trace Ph1 formed by the plurality of first marking points Pt1~Pt9 and a second trace Ph2 formed by the plurality of second marking points Qt8~Qt16. The first trace Ph1 and the second trace Ph2 can represent a moving path of the target object O respectively inside capturing areas of the first monitoring camera 12 and the second monitoring camera 16. After the first trace Ph1 and the second trace Ph2 are acquired, step S104 is executed to compute rotation of the first monitoring image I1' and the second monitoring image I2' in accordance with the first trace Ph1 and the second trace Ph2.

Generally, the target object O in uniform motion can be applied for acquiring preferred image calibration efficiency, which means an interval between any two adjacent first marking points can be the same as an interval between other two adjacent first marking points inside the plurality of first marking points Pt1~Pt9, or means a difference between the foresaid interval between any two adjacent first marking points and the foresaid interval between other two adjacent first marking points inside the plurality of first marking points Pt1~Pt9 can be smaller than a specific reference value. Accordingly, an interval between any two adjacent second marking points can be the same as an interval between other two adjacent second marking points inside the plurality of second marking points Qt8~Qt16, or a difference between the foresaid interval between any two adjacent second marking points and the foresaid interval between other two adjacent second marking points inside the plurality of second marking points Qt8~Qt16 can be smaller than the specific reference value. The specific reference value can be set according to sampling frequency of the first monitoring camera 12 and the second monitoring camera 16.

If the monitoring camera system 10 detects that the target object O is not moved at a constant speed inside the monitoring region Rm, such as the difference between one interval between any two adjacent marking points and another interval between other two adjacent marking points being greater than the specific reference value, the monitoring camera system 10 may abandon the marking points generated by the target object O not moved at the constant speed. Further, the monitoring camera system 10 may sieve and utilize some marking points, which has the difference smaller than the specific reference value, to execute the image calibrating method, or may suggest the target object O moving at the constant speed and then acquire the marking points provided by the target object O in the uniform motion for related computation.

The image calibrating method of the present invention can sieve the plurality of first marking points Pt1~Pt9 to generate the first trace Ph1, and further sieve the plurality of second marking points Qt8~Qt16 to generate the second trace Ph2 via regression analysis; an analyzing algorithm is not limited to the above-mentioned embodiment. As an example of the first monitoring image I1, the operation processor 14 can set a virtual line L, and compute distances between the virtual line L and each of the plurality of first marking points Pt1~Pt9. If the distance of one marking point is far from the virtual line L, the foresaid marking point can be abandoned; if the distance of one marking point is close to the virtual line L, the foresaid marking point can be preserved for computing the first trace Ph1. For example, when the distance between the first marking point Pt1 and the virtual line L is greater than a specific threshold, the first marking point Pt1 can be abandoned; when the distances between the first marking points Pt2~Pt9 and the virtual line L are smaller than the specific threshold, the first marking points Pt2~Pt9 can be applied for forming the first trace Ph1. Setting of the threshold may depend on identification accuracy and computation efficiency of the monitoring camera system 10 and/or an amount of the marking point. The second marking points Qt15~Qt16 of the second trace Ph2 may be abandoned according to the embodiment mentioned above. Computation of the second trace Ph2 can be the same as computation of the first trace Ph1, and a detailed description is omitted herein for simplicity.

In this embodiment, the first trace Ph1 and the second trace Ph2 can be straight lines. The target object O is moved along the straight lines, so that some marking points with large deviation can be easily discovered and sieved; as shown in FIG. 5, the first marking point Pt1 and the second marking point Qt15~Qt16 can be excluded. If the target object O is zigzagged instead of being moved along the straight line, the first trace Ph1 and the second trace Ph2 may belong to curves. Any curve of the first trace Ph1 and/or the second trace Ph2 having a curvature conforming to a specific condition can be applied for the image calibrating method of the present invention. The specific condition may represent the curvature is smaller than a specific value or within a specific range.

Then, steps S106 and S108 are executed to set a first stretching section Ps1 at a tracing direction of the first trace Ph1 and a second stretching section Ps2 at a tracing direction of the second trace Ph2, and set a plurality of first estimating points Pt10~Pt14 on the first stretching section Ps1 and a plurality of second estimating points Qt2~Qt7 on the second stretching section Ps2. The first stretching section Ps1 can stretch from the first monitoring image I1' to the second monitoring image I2'; the second stretching section Ps2 can stretch from the second monitoring image I2' to the first monitoring image I1'. A sampling frequency of the estimating point preferably can be equal to a sampling frequency of the marking point. An interval between any two adjacent first marking points can be the same as an interval between any two adjacent first estimating points, or a difference between the foresaid interval between any two adjacent first marking points and the foresaid interval between any two adjacent first estimating points can be smaller than the specific reference value. Accordingly, an interval between any two second marking points can be the same as an interval between any two second estimating points, or the difference between the foresaid interval between any two second marking points and the foresaid interval between any two second estimating points can be smaller than the specific reference value.

The present invention can acquire the marking points when the target object O is moved at the constant speed, and set the estimating points in accordance with the sampling frequency of the marking point, so that the interval between any two adjacent sampling points of the first marking points Pt2~Pt9 can be the same as or similar to the interval between any two adjacent sampling points of the second estimating points Qt2~Qt7 and the second marking points Qt8~Qt9, and the interval between any two adjacent sampling points of the second marking points Qt8~Qt14 can be the same as or similar to the interval between any two adjacent sampling points of the first marking points Pt8~Pt9 and the first estimating points Pt10~Pt14. A difference between any sampling point on the first trace Ph1 and the stretching section Ps1 and a corresponding sampling point on the second trace Ph2 and the second stretching section Ps2 can be applied for computing linear shift of the monitoring images I1' and I2'. Then, step S110 is executed to compute shift of the first monitoring image I1' and the second monitoring image I2' via the first marking points Pt2~Pt9 and the second estimating points Qt2~Qt7 and the second marking points Qt8~Qt9, and/or the first marking points Pt8~Pt9 and the first estimating points Pt10~Pt14 and the second marking points Qt8~Qt14.

The image calibrating method can compute a minimal interval, an average interval or a related transformed interval between one or several sampling points of the first marking points Pt2~Pt9 and the first estimating point Pt10~Pt14 and one or several corresponding sampling points of the second estimating points Qt2~Qt7 and the second marking points Qt8~Qt14, for being the linear shift of the first trace Ph1 and the second trace Ph2. For example, an interval between the first marking point Pt2 and the second estimating point Qt2 can be computed to be the shift of the monitoring images I1' and I2'; besides, all intervals between the first marking points Pt2~Pt9 and the second estimating and marking points Qt2~Qt9 can be respectively computed, and the minimal interval or the average interval can be selected or computed to set as the shift of the monitoring images I1' and I2'; moreover, some intervals between the first marking and estimating points Pt2, Pt4, Pt6, Pt8, Pt10 and the second marking and estimating points Qt2, Qt4, Qt6, Qt8, Qt10 can be individually computed, and the minimal interval or the average interval can be selected or computed to set as the shift of the monitoring images I1' and I2'.

Final, step S112 is executed to amend the monitoring images I1' and I2' via the rotation and the shift for stitching. Generally, the image calibrating method of the present invention can utilize the rotation to amend rotary deviation of the first monitoring image I1' and the second monitoring image I2', and then utilize the linear shift to amend and stitch the first monitoring image I1' and the second monitoring image I2'.

The shift of the monitoring images I1' and I2' can be computed by a variety of ways in step S110. In the first embodiment, original data of the first marking and estimating points Pt2~Pt14 and the second marking and estimating points Qt2~Qt14 are utilized to compute the shift. In the second embodiment, the marking point and the estimating point can be adjusted by different weighting. The marking points Pt2~Pt9 and Qt8~Qt14 are sampling points actually detected by the monitoring camera system 10, and the estimating points Pt10~Pt14 and Qt2~Qt7 are sampling points presumed by the monitoring camera system 10, so the first marking points Pt2~Pt9 and the second marking points Qt8~Qt14 can be adjusted by a first weighting, and the first estimating points Pt10~Pt14 and the second estimating points Qt2~Qt7 can be adjusted by a second weighting. The first weighting preferably can be, but not limited to, greater than or at least equal to the second weighting. A ratio of the first weighting to the second weighting can be changed according to actual demand for varying sensitivity and accuracy of the image calibrating method.

In the third embodiment, the marking points and the estimating points inside the monitoring images I1' and I2' can be divided into several group and respectively adjusted by different weightings. As an example of the first monitoring image I1', the first marking points Pt2~Pt9 and the second estimating points Qt2~Qt7 and the second marking points Qt8~Qt9 can be at least divided into a first tracing group G1 and a second tracing group G2. The first tracing group G1 can be consisted of the first marking points Pt2~Pt4 and the second estimating point Qt2~Qt4 close to a center of the first monitoring image I1'. The second tracing group G2 can be consisted of the first marking points Pt5~Pt9 and the second estimating points Qt5~Qt7 and the second marking points Qt8~Qt9 close to a boundary of the first monitoring image I1'. The first tracing group G1 and the second tracing group G2 can be adjusted respectively by the first weighting and the second weighting; it should be mentioned that the first marking points Pt8~Pt9 and the second marking points Qt8~Qt9 are the actually-detected sampling points and may be adjusted still by the second weighting due to above-mentioned rules in the third embodiment, or may be adjusted by the first weighting because of property of the actually-detected sampling point, or may be adjusted further by a third weighting ranged between the first weighting and the second weighting for computing the shift. In the embodiment, the first tracing group G1 contains the sampling points captured or estimated by a center of the pixel array of the first monitoring camera 12 and can provide preferred accuracy. The second tracing group G2 contains the sampling points captured or estimated by an edge of the pixel array of the first monitoring camera 12 and provides insufficient accuracy. The first weighting preferably can be greater than or at least equal to the second weighting.

In the third embodiment, the first weighting and the second weighting are different form each other and set due to accuracy variation in the center and the boundary of the pixel array of the monitoring camera. A ratio of the first weighting to the second weighting can be decided according to a quality or a property of the monitoring camera; in some possible situations, the first weighting may be equal to the second weighting, which means the image calibrating method can adjust the ratio of the first weighting to the second weighting in accordance with the actual demand.

In addition, an amount and a coverage range of the tracing group are not limited to the above-mentioned embodiments, which depend on design demand. In a possible embodiment, the first monitoring image I1' may be divided into three tracing groups, and each of the three tracing groups can contain one or more marking points and estimating points. The first marking points Pt8~Pt9 and the second marking points Qt8~Qt9 in the first monitoring image I1' are actually-detected sampling points and normally adjusted by the high-level weighting, and an actual application is not limited to the above-mentioned embodiments.

In conclusion, the image calibrating method and related monitoring camera system of the present invention can not only utilize the interval between the marking points in an overlapped area of two monitoring images to compute the shift and the rotation, but also can set the estimating points on the stretching section stayed inside one monitoring image and stretched from the trace established by the marking points on another monitoring image; difference between the marking point and the estimating point located outside the overlapped area of the monitoring images can be applied to compute the shift. The image calibrating method of the present invention can estimate the previous trace before the target object enters the monitoring area and the following trace when the target object leaves the monitoring area, so that a range about the overlapped area of the monitoring images can be enlarged to increase the amount of the sampling points for computing the accurate shift of the monitoring images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image calibrating method applied to a monitoring camera system having a first monitoring camera and a second monitoring camera, a first monitoring image acquired by the first monitoring camera being partly overlapped with a second monitoring image acquired by the second monitoring camera, the image calibrating method comprising:
   detecting a plurality of first marking points about a target object within the first monitoring image and a plurality of second marking points about the target object within the second monitoring image;
   computing a first trace formed by the plurality of first marking points and a second trace formed by the plurality of second marking points;
   setting a plurality of first estimating points on a stretching section of the first trace within the second monitoring image;
   setting a plurality of second estimating points on a stretching section of the second trace within the first monitoring image; and
   utilizing at least one of assembly of the plurality of first marking points and the plurality of second estimating points and assembly of the plurality of first estimating points and the plurality of second marking points to compute a shift between the first monitoring image and the second monitoring image;
   wherein the first trace and the second trace are straight lines, or curves with a curvature conforming to a specific condition.

2. The image calibrating method of claim 1, wherein computing the first trace formed by the plurality of first marking points comprises:
   setting a virtual line;
   computing distances between the virtual line and each of the plurality of first marking points;
   selecting at least two first marking points having the distance smaller than a threshold; and
   generating the first trace by the at least two first marking points.

3. The image calibrating method of claim 1, wherein a difference between one interval between any two adjacent first marking points and another interval between other two adjacent first marking points of the plurality of first marking points is smaller than a reference value.

4. The image calibrating method of claim 3, wherein a difference between one interval between any two adjacent first marking points of the plurality of first marking points and another interval between any two adjacent first estimating points of the plurality of first estimating points is smaller than the reference value.

5. The image calibrating method of claim 1, wherein the shift is computed via the plurality of first marking points adjusted by a first weighting and the plurality of second estimating points adjusted by a second weighting, and the first weighting is greater than or equal to the second weighting.

6. The image calibrating method of claim 1, wherein the plurality of first marking points and the plurality of second estimating points are divided into a first tracing group and a second tracing group, the first tracing group consists of at least one first marking point and at least one second estimating point on a center of the first monitoring image, the second tracing group consists of at least one first marking point and at least one second estimating point on a boundary of the first monitoring image, the shift is computed via the first tracing group adjusted by a first weighting and the second tracing group adjusted by a second weighting, and the first weighting is greater than or equal to the second weighting.

7. The image calibrating method of claim 1, wherein at least one first marking point selected from the plurality of first marking points and at least one second estimating point selected from the plurality of second estimating points are utilized to compute the shift.

8. A monitoring camera system, comprising:
a first monitoring camera adapted to acquire a first monitoring image;
a second monitoring camera adapted to acquire a second monitoring image partly overlapped with the first monitoring image; and
an operation processor electrically connected to the first monitoring camera and the second monitoring camera for acquiring the first monitoring image and the second monitoring image, the operation processor being adapted to detect a plurality of first marking points about a target object within the first monitoring image and a plurality of second marking points about the target object within the second monitoring image, compute a first trace formed by the plurality of first marking points and a second trace formed by the plurality of second marking points, set a plurality of first estimating points on a stretching section of the first trace within the second monitoring image, set a plurality of second estimating points on a stretching section of the second trace within the first monitoring image, and utilize at least one of assembly of the plurality of first marking points and the plurality of second estimating points and assembly of the plurality of first estimating points and the plurality of second marking points for computing a shift between the first monitoring image and the second monitoring image;
wherein at least one first marking point selected from the plurality of first marking points and at least one second estimating point selected from the plurality of second estimating points are utilized to compute the shift.

9. The monitoring camera system of claim 8, wherein the shift is computed via the plurality of first marking points adjusted by a first weighting and the plurality of second estimating points adjusted by a second weighting, and the first weighting is greater than or equal to the second weighting.

10. An image calibrating method applied to a monitoring camera system having a first monitoring camera and a second monitoring camera, a first monitoring image acquired by the first monitoring camera being partly overlapped with a second monitoring image acquired by the second monitoring camera, the image calibrating method comprising:
detecting a plurality of first marking points about a target object within the first monitoring image and a plurality of second marking points about the target object within the second monitoring image;
computing a first trace formed by the plurality of first marking points and a second trace formed by the plurality of second marking points;
setting a plurality of first estimating points on a stretching section of the first trace within the second monitoring image;
setting a plurality of second estimating points on a stretching section of the second trace within the first monitoring image; and
utilizing at least one of assembly of the plurality of first marking points and the plurality of second estimating points and assembly of the plurality of first estimating points and the plurality of second marking points to compute a shift between the first monitoring image and the second monitoring image;
wherein the shift is computed via the plurality of first marking points adjusted by a first weighting and the plurality of second estimating points adjusted by a second weighting, and the first weighting is greater than or equal to the second weighting.

11. The image calibrating method of claim 10, wherein computing the first trace formed by the plurality of first marking points comprises:
setting a virtual line;
computing distances between the virtual line and each of the plurality of first marking points;
selecting at least two first marking points having the distance smaller than a threshold; and
generating the first trace by the at least two first marking points.

12. The image calibrating method of claim 10, wherein a difference between one interval between any two adjacent first marking points and another interval between other two adjacent first marking points of the plurality of first marking points is smaller than a reference value.

13. The image calibrating method of claim 12, wherein a difference between one interval between any two adjacent first marking points of the plurality of first marking points and another interval between any two adjacent first estimating points of the plurality of first estimating points is smaller than the reference value.

14. The image calibrating method of claim 10, wherein the plurality of first marking points and the plurality of second estimating points are divided into a first tracing group and a second tracing group, the first tracing group consists of at least one first marking point and at least one second estimating point on a center of the first monitoring image, the second tracing group consists of at least one first marking point and at least one second estimating point on a boundary of the first monitoring image, the shift is computed via the first tracing group adjusted by a first weighting and the second tracing group adjusted by a second weighting, and the first weighting is greater than or equal to the second weighting.

15. The image calibrating method of claim 10, wherein at least one first marking point selected from the plurality of first marking points and at least one second estimating point selected from the plurality of second estimating points are utilized to compute the shift.

16. An image calibrating method applied to a monitoring camera system having a first monitoring camera and a second monitoring camera, a first monitoring image acquired by the first monitoring camera being partly overlapped with a second monitoring image acquired by the second monitoring camera, the image calibrating method comprising:
detecting a plurality of first marking points about a target object within the first monitoring image and a plurality of second marking points about the target object within the second monitoring image;
computing a first trace formed by the plurality of first marking points and a second trace formed by the plurality of second marking points;
setting a plurality of first estimating points on a stretching section of the first trace within the second monitoring image;

setting a plurality of second estimating points on a stretching section of the second trace within the first monitoring image; and utilizing at least one of assembly of the plurality of first marking points and the plurality of second estimating points and assembly of the plurality of first estimating points and the plurality of second marking points to compute a shift between the first monitoring image and the second monitoring image;

wherein at least one first marking point selected from the plurality of first marking points and at least one second estimating point selected from the plurality of second estimating points are utilized to compute the shift.

17. The image calibrating method of claim 16, wherein computing the first trace formed by the plurality of first marking points comprises:

setting a virtual line;

computing distances between the virtual line and each of the plurality of first marking points;

selecting at least two first marking points having the distance smaller than a threshold; and generating the first trace by the at least two first marking points.

18. The image calibrating method of claim 16, wherein a difference between one interval between any two adjacent first marking points and another interval between other two adjacent first marking points of the plurality of first marking points is smaller than a reference value.

19. The image calibrating method of claim 18, wherein a difference between one interval between any two adjacent first marking points of the plurality of first marking points and another interval between any two adjacent first estimating points of the plurality of first estimating points is smaller than the reference value.

20. The image calibrating method of claim 16, wherein the plurality of first marking points and the plurality of second estimating points are divided into a first tracing group and a second tracing group, the first tracing group consists of at least one first marking point and at least one second estimating point on a center of the first monitoring image, the second tracing group consists of at least one first marking point and at least one second estimating point on a boundary of the first monitoring image, the shift is computed via the first tracing group adjusted by a first weighting and the second tracing group adjusted by a second weighting, and the first weighting is greater than or equal to the second weighting.

* * * * *